United States Patent [19]

Iwasawa et al.

[11] Patent Number: 5,151,991
[45] Date of Patent: Sep. 29, 1992

[54] PARALLELIZATION COMPILE METHOD AND SYSTEM

[75] Inventors: Kyoko Iwasawa, Tokyo; Yoshikazu Tanaka, Oomiya; Shizuo Gotou, Machida, all of Japan

[73] Assignee: Hitachi, Ltd., Tokyo, Japan

[21] Appl. No.: 259,243

[22] Filed: Oct. 18, 1988

[30] Foreign Application Priority Data

Oct. 21, 1987 [JP] Japan ............................... 62-263788

[51] Int. Cl.⁵ .............................................. G06F 9/45
[52] U.S. Cl. ................... 395/700; 364/DIG. 1; 364/230; 364/280.4; 364/262.1
[58] Field of Search ............... 364/200 MS, 900 MS; 395/700

[56] References Cited

PUBLICATIONS

Effect of Restructuring Compilers on Program Performance for High-Speed Computers; Cytron et al. Computer Physics Communications. 37 (1985) pp. 39-48.
Advanced Compiler Optimizations for Supercomputers; Padua et al., Communications of the ACM, vol. 29, Dec. 1986, pp. 1184-1201.

Primary Examiner—Gareth D. Shaw
Assistant Examiner—Kakali Chaki
Attorney, Agent, or Firm—Fay, Sharpe, Beall, Fagan, Minnich & McKee

[57] ABSTRACT

In order to make parallel processing of a serial execution type user program automatically and at a high speed without re-coding, an object code is parallelized by detection of the possibility of parallel execution in an iteration unit of a loop, detection of the possibility of parallel execution of each statement in the loop, the interchange of an outer loop by an inner loop of a multiple loop, reduction of the multiple loop to a single loop, inclined coversion for making parallel execution along a wave front plane (line) when sufficient multiplicity is not derived, and the program which is estimated to have the shortest processing time is selected from the granularity, and multiplicity of the object code, the variance of the number of instructions and the proportion of synchronization control at the time of parallelization of the object code.

17 Claims, 10 Drawing Sheets

```
DO   10   I = 1, 10              ———— 16
     C( I ) = I * I              ———— 17
DO   10   J = 1, 100             ———— 18
     A( I+1, J ) = X( J ) / Y( J ) — 19
     D( I )      = C( I ) + A( I, J ) — 20
10 CONTINE                       ———— 21
```

FIG. 7

70 — COUNT THE NUMBER OF LOOP CARRIED DEPENDENCE IN THIS LOOP AND DETECT THE ONE WHOSE NUMBER OF LOOP ITERATION TIMES IS MINIMUM.

71 — STORE THE VALUE SUBTRACTED 1 FROM THE DETECTED LOOP ITERATION TIMES BY PROCESS 70, TO THE MULTIPLICITY FIELD OF THE LOOP TABLE. IF THERE ARE NO LOOP CARRIED ITERATION LOOP, STORE A PRESUMED LOOP LENGTH AS SAID MULTIPLICITY.

72 — ESTIMATE THE DYNAMIC NUMBER OF EXECUTED INSTRUCTION PER EACH ITERATION. (COUNT TEXTUAL NUMBER OF INSTRUCTION, AND MULTIPLY IT BY LOOP LENGTH)

73 — IF SAID ESTIMATED DYNAMIC NUMBER PER EACH ITERATION IS MAME, STORE THE NUMBER TO THE LOOP TABLE AND IF DIFFERENT, STORE EACH NUMBER TO THE LOOP TABLE.

74 — COMPUTE SYNCHRONIZATION RATIO FROM THE ITERATION TIMES CARRIED BY DATA DEPENDENCE AND THE DYNAMIC NUMBER OF EXECUTED INSTRUCTION PER EACH ITERATION, AND STORE IT TO THE LOOP TABLE.

FIG. 8

75 — DETECT THE POINT WHERE THE LOOP CAN BE SPLITTED STORE THE VALUE ADDED BY 1 TO THE NUMBER OF THE POINTS WHERE THE LOOP CAN BE SPLITTED TO THE MULTIPLICIY FIELD OF THE LOOP TABLE.

76 — ESTIMATE THE DYNAMIC NUMBER OF EXECUTED INSTRUCTION BETWEEN LOOP SPLITTING POINTS AND STORE THE MAXIMUM NUMBER AND MINIMUM NUMBER TO THE LOOP TABLE.

77 — COMPUTE SYNCHRONIZATION RATIO FROM THE DATA DEPENDENCE RELATION ACROSS THE LOOP SPLITTING POINTS AND STORE IT TO THE LOOP TABLE.

PARALLELIZATION COMPILE METHOD AND SYSTEM

BACKGROUND OF THE INVENTION

1. Field of the Invention

This invention relates generally to a parallel computer system. More particularly, the present invention relates to a method and system for generating an object program suitable for executing in parallel from a source program described by a higher language of a serial execution type, or the like.

2. Description of the Prior Art

In a parallel processor system such as a multi-processor, it has been necessary conventionally for a user to describe explicitly means for parallelization, instructions such as actuation and synchronization of a task, etc., into a serial type source program as a user interface. The article "A Data Flow Approach To multitasking on CRAY X-MP Computers", ACM-0-89791-174-1-12185-0107, describes the operation of multitasking by operating four vector processors in parallel and a user's directive method for that purpose. According to this prior art reference, a library for the control of actuation and synchronization of tasks is prepared in the system and a user makes a statement for calling it in a FORTRAN program. At a finer level the user must instruct the parallelization means for each loop in the form of a control statement of a comment system to a compiler.

However, there have been no prior art references that mention automatic parallelization means from a serial type compiler language for such a multi-processor system.

The prior art technique described above does not pay any consideration to automatic parallelization for hardwares capable of parallel processing. Therefore, it has been necessary for the user to consider by himself means for parallel processing and to explicitly put it into the program as program conversion. In other words, serial type programs that the user keeps as the property cannot be subjected as such to parallel execution and re-coding for the parallel processing and its debugging must be carried out. Instructions for parallelization must be changed whenever the characteristics of the hardware change in order to fully utilize the resources and the program does not run in other systems. Thus the versatility of the user program is lost.

SUMMARY OF THE INVENTION

It is therefore an object of the present invention to provide a parallelization compile method and system which can mitigate the load to users, can parallelize automatically existing serial type programs as such without modification and can generate efficient object codes without taking fine characteristics of hardwares into specific consideration even when coding is made afresh.

In a compiler for generating an object code consisting of instruction columns for executing in parallel from a source program on a multi-processor consisting of processors that operate in parallel with one another, the present invention allots an executable parallel processing detected by at least one of the following two detections to any of a plurality of processors described above, whereby one of the detection is to detect the possibility of parallel execution in each iteration unit inside a certain loop for each of the loops for making iteration computation in a program for a computer of a serial execution type single processor system and the second of the detection is to detect the possibility of parallel execution of each statement inside a loop; then estimates an elapsed time before the computation result is obtained (or execution time) when the object code described above is executed in parallel, in accordance with the performance of the allotted processors; and selects the processing which is judged to be the best at the time of compile inclusive of the estimated result and the estimated time when parallel execution is not made; so that a serial execution type program is converted to a parallel execution type program.

The above will be explained in further detail.

In automatic parallelization processing of a complier, the object of the invention, can be accomplished by executing the following processings from outer loops to inner loops.

First of all, the possibility of parallel execution of each iteration of the loop is detected.

```
       DO 10 I = 1, N
       DO 20 J = 1, M
       A(I, J) = A(I, J) + X(I, J) ... (1)
       B(I, J) = B(I, J)*C(J)/D(I) ... (2)
    20 CONTINUE
    10 CONTINUE
```

For the program such as described above, the possibility of parallel execution of inner loop DO 20 at each value of $I=1, I=2, \ldots, I=N$ is detected, and

```
          ⎡ DO 20 J = 1, M
processor │ A(1, J) = A(1, J) + X(1, J) ... (1)
    1     │ B(1, J) = B(1, J)*C(J)/D(1) ... (2)
          ⎣ 20 CONTINUE ⎡ DO 20 J = 1, M
processor │ A(2, J) = A(2, J) + X(2, J) ... (1)
    2     │ B(2, J) = B(2, J)*C(J)/D(2) ... (2)
          ⎣ 20 CONTINUE
```

Next, the possibility of parallel execution of the statement (1), (2) at each value of $I=1, I=2, \ldots, J=M$ is detected.

```
              DO 10 I = 1, N processor ⎡ A(1, 1) = A(1, 1) + X(1, 1) ... (1)
    1     ⎣ B(1, 1) = B(1, 1)*C(1)/D(1) ... (2)

processor ⎡ A(1, 2) = A(1, 2) + X(1, 2) ... (1)
    2     ⎣ B(1, 2) = B(1, 2)*C(2)/D(1) ... (2)

10 CONTINUE
```

In the manner described above, the program is divided and the items that will affect improvement in a speed, that is, an acceleration ratio, when the programs are executed and processed sequentially in parallel by mutually different processors are calculated and the results are stored in a table for each loop. First of all, multiplicity is calculated by judging whether or not the definition determining the data value on the memory at the same address and the use of such a value occurs in the different number of iterations. Next, the number of instructions per parallel processing unit (which is referred to as "granularity") and its variation are calculated by counting the kinds and number of textual operators of the source program and the estimated number of iteration of loops. Furthermore, the proportion (ratio) of the number of instructions necessary for executing in parallel for each iteration of loop to the total number of instructions is calculated.

Next, the possibility of parallel execution for each statement is detected In the case of the same source program as one described above, for example, the statement (1) and the statement (2) are divided by the inner loop and the possibility of their parallel execution is detected.

```
        DO 10 I = 1, N
processor ⎡ DO 20 J = 1, M
    1     ⎣   A(I, J) = A(I, J) + X(I, J) ... (1)

processor ⎡ DO 20 J = 1, M
    2     ⎣   B(I, J) = B(I, J)*C(J)/D(I) ... (2)
            10 CONTINUE
```

Since two statements exist inside the loop in this example, the program is divided into two and the items that will affect the speed-up, that is, the acceleration ratio, when they are executed in parallel by different processors are calculated and stored in the table for each loop. First, loop-unsplittable recursive calculation is detected and the multiplicity is calculated from the number of statements Next, the number of instructions (granularity) is counted for each statement as the unit of parallel processing, for each inner loop and for each recursive calculation unit from the number of textural operators of the source program and the estimated loop iteration times to compute the size of each granule and the variance (or inequality) of granularity. Furthermore, the proportion of the number of instructions for making synchronization control to the total number of instructions is computed from the data dependence relation of each statement.

Furthermore, the new possibility of parallel execution that occurs due not to one loop alone but to the combination of multiple loops is detected. First, in order to judge whether or not the multiple loops can be combined, judgement is made as to whether or not they can be converted to tightly nested multiple loops. Only when such a possibility is recognized, the possibility of parallel processing when the following three kinds of loop structure conversion are made is examined.

When there is the possibility of parallel processing for the loop as the object, loop conversion is made in order to interchange it by its outer loop to improve granularity. Therefore, only when this condition is satisfied, loop interchange possibility is judged and if it is found possible, the multiplicity, the variance (or inequality) of the number of instructions and the proportion of synchronization control are calculated and the results are stored in the table. In the case of the source program which is the same as described above, interchange is made between the DO 10 loop and the DO 20 loop and the possibility of parallel execution of the inner DO 10 loop is detected at each value of $J=1, J=2, \ldots, J=M$ of the DO 20 loop which now becomes a new outer loop.

Then, the program is divided in the following way.

```
processor ⎡ DO 10 I = 1, N
    1     ⎢ A(I, 1) = A(I, 1) + X(I, 1) ... (1)
          ⎢ B(I, 1) = B(I, 1)*C(1)/D(I) ... (2)
          ⎣ 10 CONTINUE processor ⎡ DO 10 I = 1, N
    2     ⎢ A(I, 2) = A(I, 2) + X(I, 2) ... (1)
          ⎢ B(I, 2) = B(I, 2)*C(2)/D(I) ... (2)
          ⎣ 10 CONTINUE
```

The multiplicity, the variance of the number of instructions and the proportion of synchronization control when they are executed by different processors are computed.

When parallel processing can be made for the object loop but multiplicity is not sufficient because its loop length is small, loop collapsion (reduction to a single loop) is made in order to reduce the outer loops of that loop to the single loop and to improve the multiplicity. Therefore, only when this condition is satisfied, the possibility of group collapsion is judged and if it proves YES, the multiplicity, variance of the number of instructions and proportion of synchronization control when reduction to the single loop is made are computed and stored in the table. In the case of the same source program as described above, the DO 10 loop and the DO 20 loop are reduced to the single loop as illustrated below:

```
DO 10 K = 1, M*N
   A(K) = A(K) + X(K)                        ... (1)
   B(K) = B(K)*C(mod(K, N+1))/D(K/M+1) ... (2)
10 CONTINUE
```

The possibility of parallel execution of the DO 10 loop at each value of $K=1, K=2, \ldots, K=M*N$ is then detected.

```
processor ⎡ A(1) = A(1) + X(1)      ... (1)
    1     ⎣ B(1) = B(1)*C(1)/D(1)   ... (2)

processor ⎡ A(2) = A(2) + X(2)      ... (1)
    2     ⎣ B(2) = B(2)*C(2)/D(1)   ... (2)
```

When sufficient multiplicity cannot be derived due to the limit of the dependence relation of the data or the like at one loop level alone, inclined conversion is made by carrying out in parallel processing along a wave front line (plane) to derive sufficient multiplicity. Therefore, when this condition is satisfied, whether or not inclined conversion is possible is judged and the multiplicity, variance of the number of instructions and the proportion of synchronization control at the time of inclined conversion are calculated and stored in the table. In the case of the source program described above, since no data dependence relation impeding the parallel processing exists, this conversion is not made.

Finally, parallelization means which is judged to be the one that shortens most the elapsed time till acquisition of the result (execution time) when parallel processing is made from the multiplicity, variance of the number of instructions and the proportion of the synchronization control thus calculated is selected. The subsequent processing of compiler converts the serial type program to the parallel execution type program.

The foregoing and other objects, advantages, manner of operation and novel features of the present invention will be understood from the following detailed description when read in conjunction with the accompanying drawings.

BRIEF DESCRIPTION OF THE DRAWINGS

FIG. 7 shows the outline of each iteration of a loop;

FIG. 8 shows the outline of parallelism detection processing of each statement of the loop;

DESCRIPTION OF THE PREFERRED EMBODIMENTS

Hereinafter, one embodiment of the present invention in a FORTRAN compiler for a multi-processor system wherein a plurality of processors operate in parallel with one another will be explained with reference to the accompanying drawings.

Figure 2:
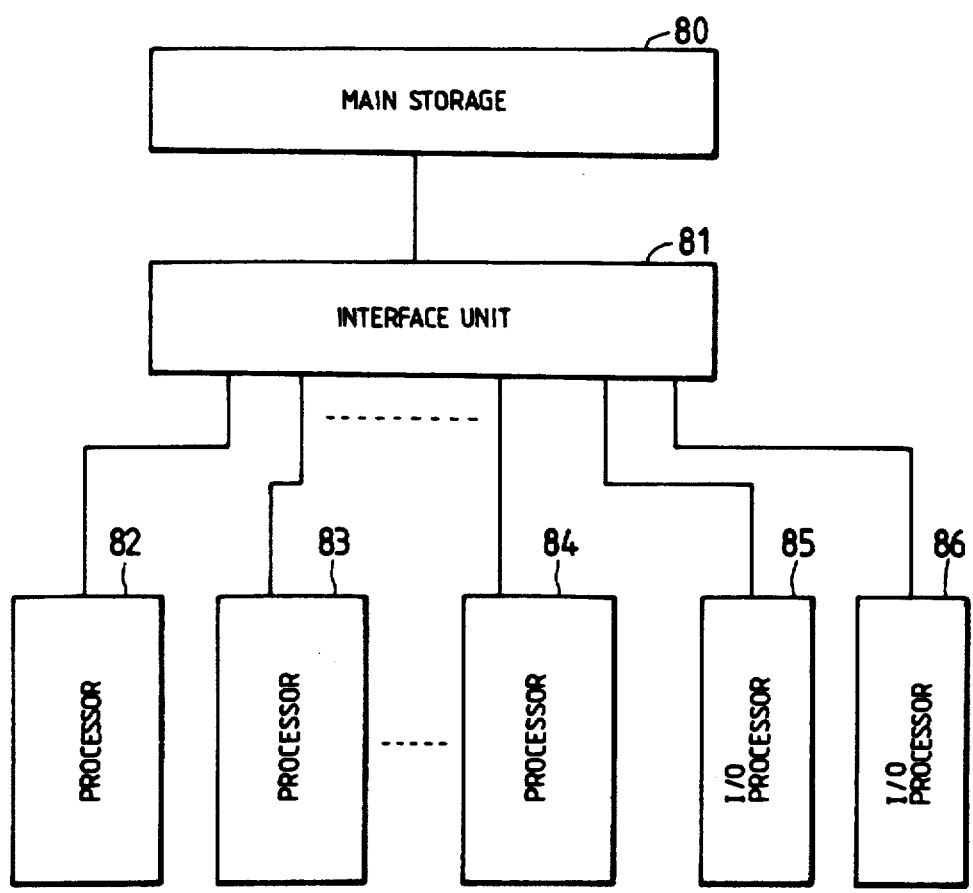
FIG. 2 is a schematic view of a system to which the present invention is applied.

FIG. 2 shows an example of the multi-processor to which the invention is applied. Here, the embodiment of the invention will be explained about the multi-processor system sharing a main storage by way of example, but the present invention can also be applied to a multi-processor system of the type wherein each processor has its own memory or storage. There are disposed CPUs 82 to 84 that operate in parallel with one another and share the main storage 80. Therefore, when each CPU makes access to the same address, sequence must be guaranteed by synchronization control. The detailed embodiment of the present invention for generating an object code which reduces the elapsed time before acquisition of the calculation result by utilizing effectively hardware resources will now be explained.

Figure 3:
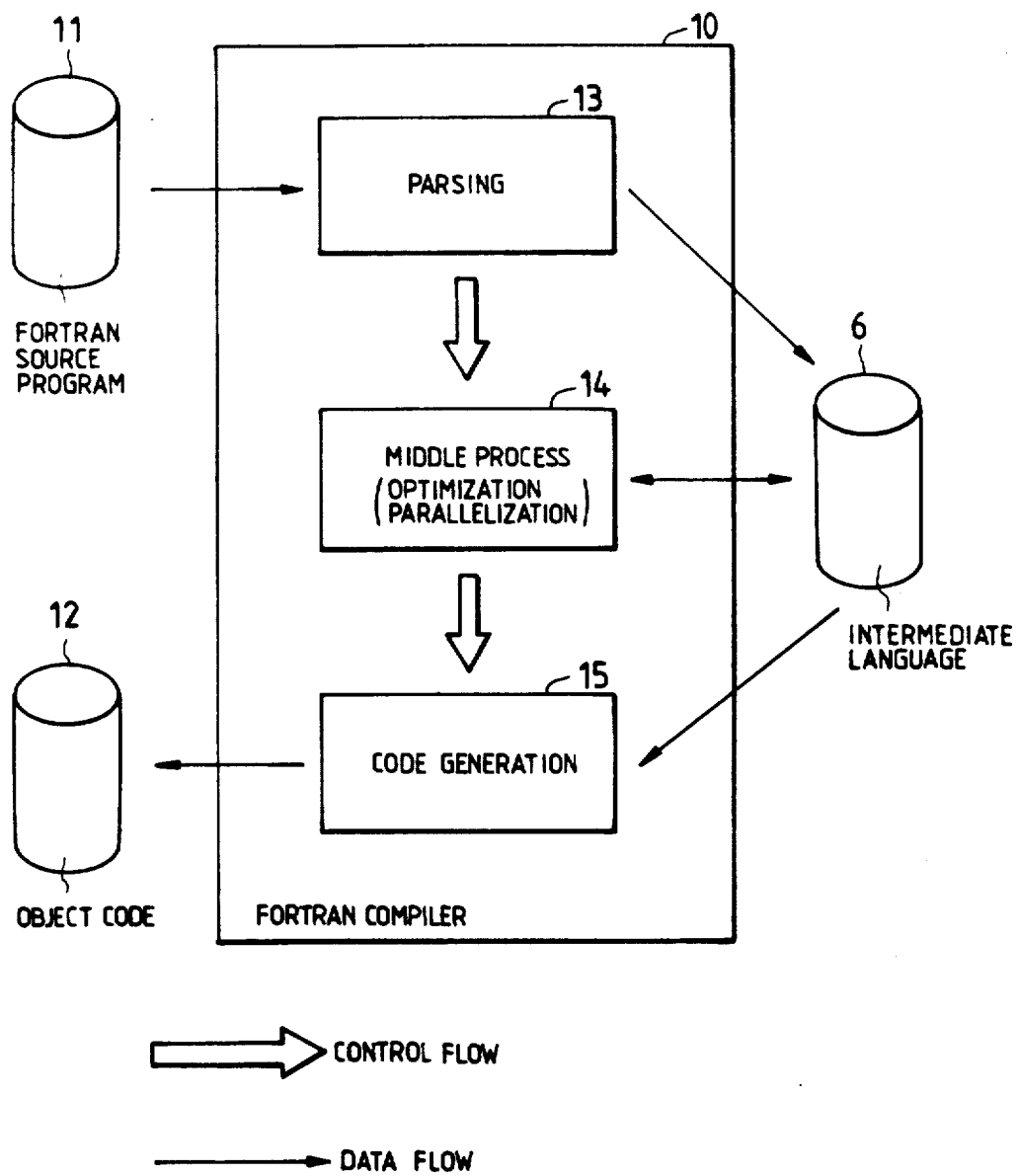
FIG. 3 is an overall view of a compiler.

FIG. 3 shows the overall structure of the compiler to which the present invention is applied. The compiler works in concert with a CPU 10 as appreciated by one of ordinary skill in the art. Parsing 13 in FIG. 3 receives the source program 11 of FORTRAN as its input and converts it to an intermediate language 6. Receiving this intermediate language 6 as the input, middle process 14 makes optimization and parallelization to modify the intermediate language 6. Code generation 15 generates an object code 12 to be executed in parallel from the intermediate language 6 modified by the middle process 14. The present invention relates to the middle process 6 and reduces the elapsed time to minimum when the object code 12 is executed in parallel.

Figure 1:
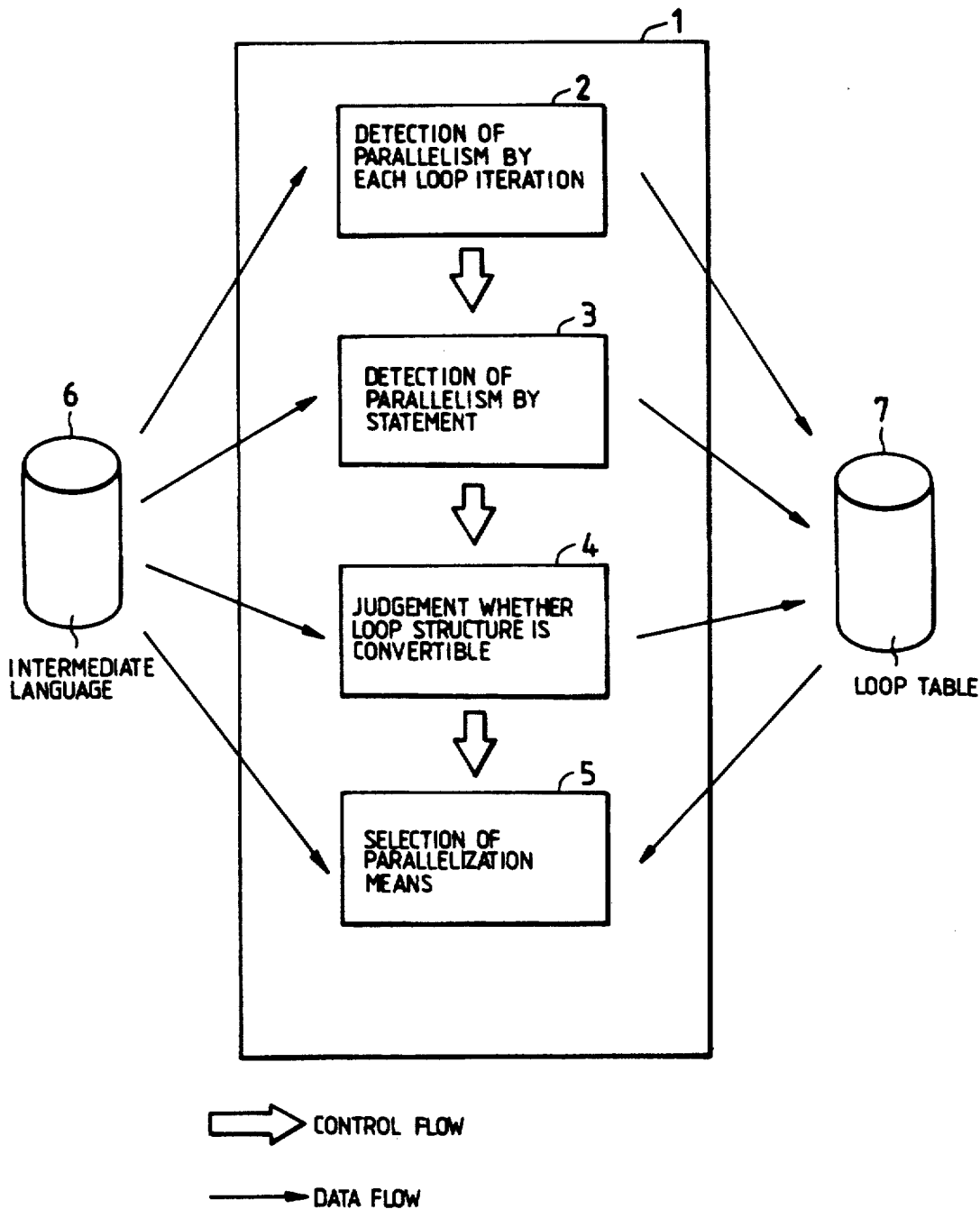
FIG. 1 shows part of automatic parallelization processing.
Figures 4, 6:
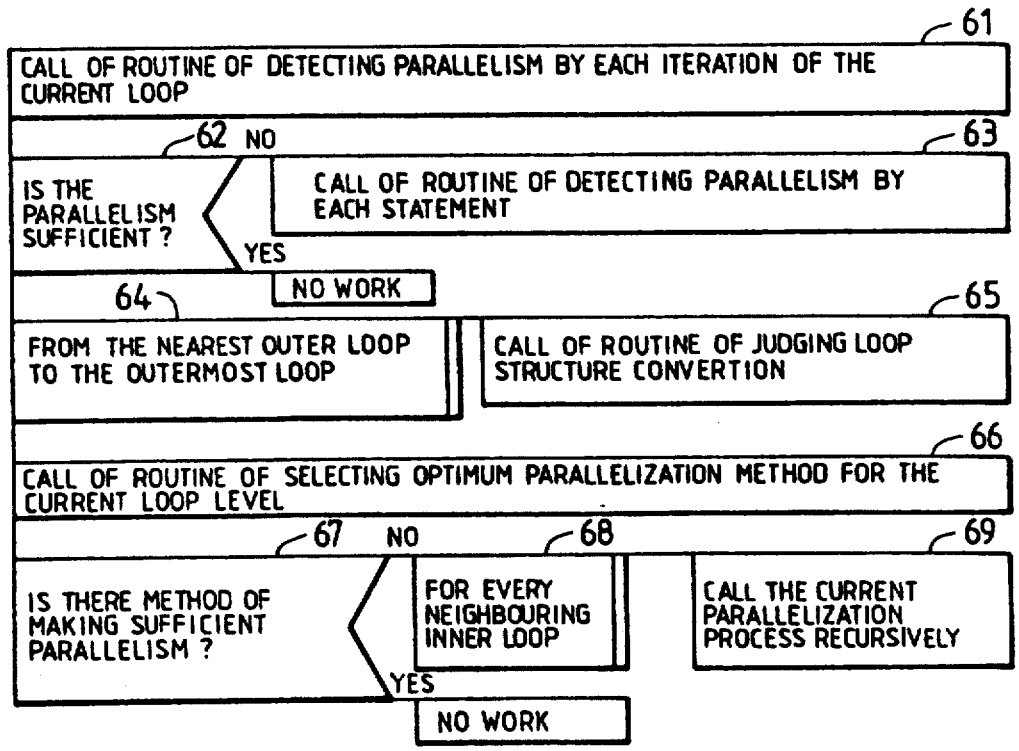
FIG. 4 shows an example of a source program in order to explain an embodiment of the invention.
FIG. 6 shows the outline of the automatic parallelization processing.
Figure 5:
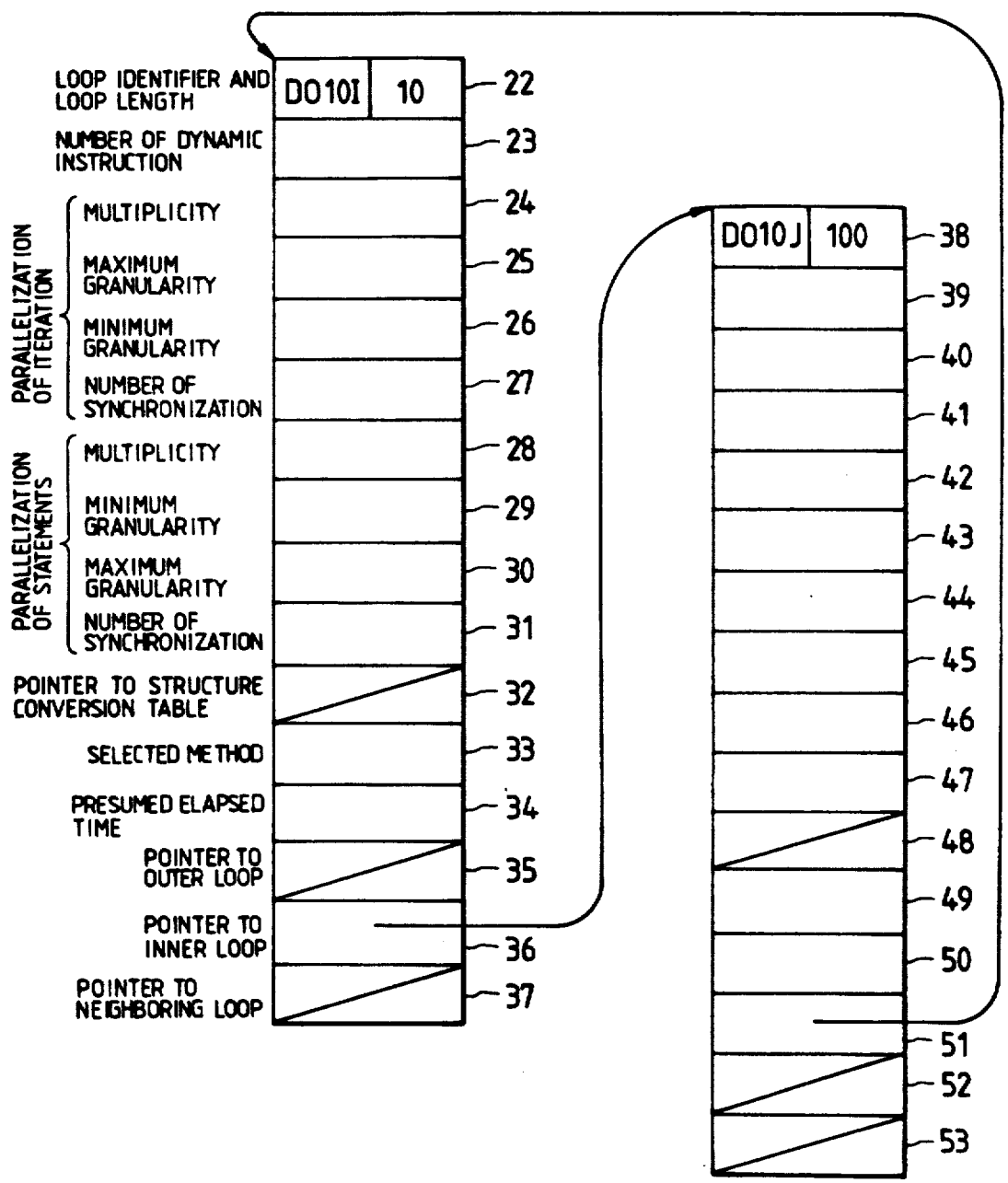
FIG. 5 shows a loop table.

In the middle process 14 shown in FIG. 3, the structure of the processing relating to automatic parallelization is shown in FIG. 1. The FORTRAN program shown in FIG. 4 is hereby used as the example of the source program 11 inputted in FIG. 3. The middle process 14 prepares two loop tables DO 10, DO 20 (the loop table 7 shown in FIG. 1) from the FORTRAN program shown in FIG. 4 and represents that they constitute a multiple loop. FIG. 5 shows the table structure for each loop.

Means for parallel processing is determined by filling each field from the outermost loop to inner loops in accordance with the loop tables shown in FIG. 5. FIG. 6 is a PAD table showing the main control of the automatic parallelization processing 1. After the loop table is secured, the middle process 14 designates the table of the leading loop on the outermost side and calls the automatic parallelization processing 1. Processing is made for this loop as shown in FIG. 6.

First of all, a pointer is given to the loop table 22 in FIG. 5 corresponding to the leading loop DO 10, loop 16–21 on the outmost side in FIG. 4 and the processing shown in FIG. 6 is executed. The parallelism detection processing 2 for each iteration of the loop of FIG. 1 is called for the loop FIG. 5, 22 in order to detect parallelism for each iteration (61 in FIG. 6).

If the processing is made sequentially from the outer loop as described above, new analysis is not necessary for the judgement of structure convertibility and for the detection of parallelism after structure conversion and the data that have already been used may be employed. For, only minimum necessary parsing is made in order to reduce the compile time.

The outline of the parallelism detection processing 2 for each iteration of the loop shown in FIG. 1 is represented by a PAD table in FIG. 7. As to the DO 10 1 loop 16–21 shown in FIG. 4, flow dependence exists from C(I) on the left side of 17 to C(I) on the right side of 20 and output dependence exists from C(I) on the left side of 17 to C(I) on the left side of 20. Furthermore, flow dependence exists from A(I+1, J) on the left side of 19 to A(I, J) on the right side of 20. Since dependence relating to C among them is loop independent, flow dependence on A is detected by the processing 70 in FIG. 7. The processing 71 calculates from these loop carried dependence iterated twice that multiplicity is 1 and this value is stored in the field 24 of the loop table of FIG. 5. The multiplicity "1" means that execution is equivalent to the serial execution. The processing 72 in FIG. 7 estimates the dynamic number of executed instruction of DO 10I loop per each iteration. The statement 17 becomes 1, the statement 19 is 100 by multiplying the textural number of instruction 1 by the loop length 100 and the statement 20 is 100 by multiplying 1 by the loop length 100. The sum of them 201 is stored in the fields 25 and 26 and the product of this value 201 by the loop length 10 of the outer loop 10 is stored in the field 23. Since synchronization is necessary whenever I is incremented by 1 from the data dependence relation, the processing 74 stores the dynamic number of executed instructions per each iteration of the loop I in the field 27.

Next, the processing 62 shown in FIG. 6 judges that sufficient multiplicity does not exist because the multiplicity is 1 and the processing 65 calls the parallelism detection portion 3 for each statement in the loop shown in FIG. 1. The outline of this processing is shown by a PAD diagram in FIG. 8. The processing 75 shown in FIG. 8 detects the loop split point between the statement 17 and the statement 18 in FIG. 4 and stores the multiplicity 2 in the field 28 in FIG. 5 because it is only the loop splitting point. As the number of executed instructions when the loop is split, the processing 76 stores the product 10 of the value 1 of the statement 17 by the outer loop length 10 in the field 29 of the minimum value. As the executed number of instructions of the statements 18 to 20, the value 200 as the products of the 2 of each statement 19, 20, the outer loop length 10 and the inner loop length 20 is stored in the field 30 of the maximum value. The processing 77 judges from the flow dependence for the statements 17 to 20 that synchronization exists ten times for the instruction 2000, and stores it in the field 31. Thereafter the processing returns to 63 in FIG. 6.

Figure 9:
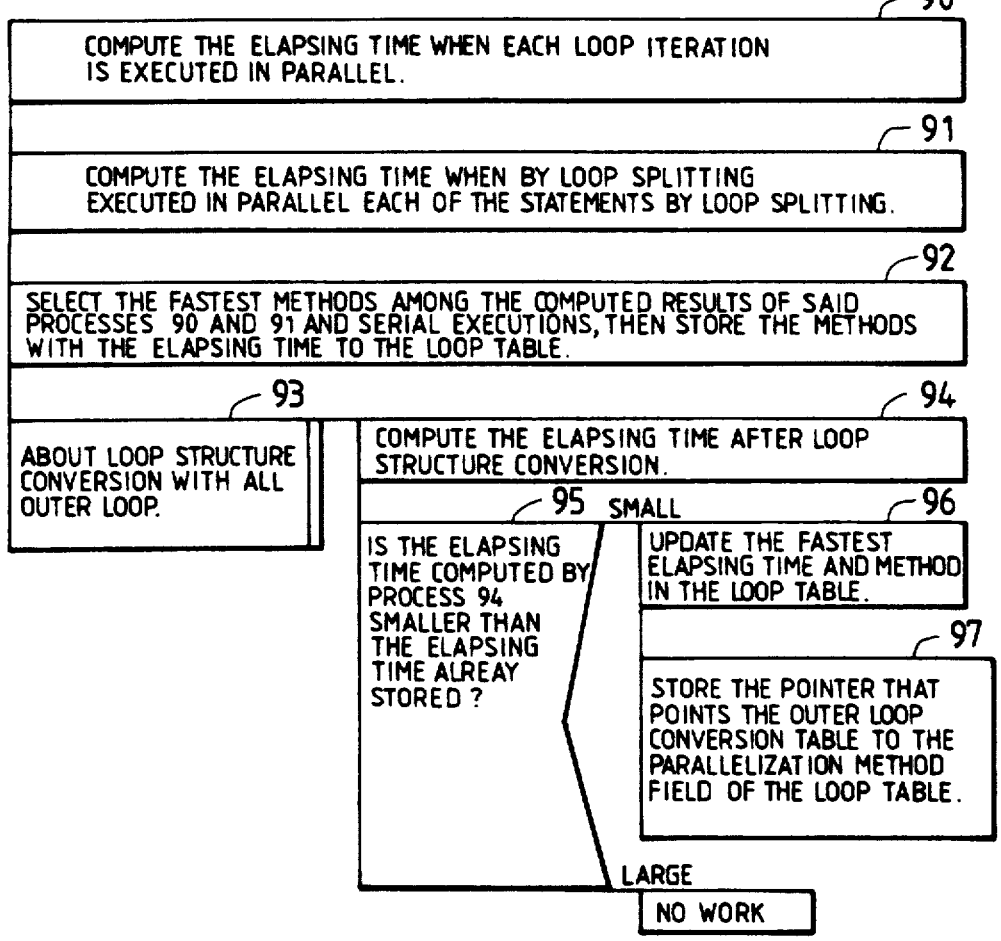
FIG. 9 shows the outline of parallelization means selection processing.

Since there is no outer loop for the DO 10I loop in FIG. 4, the processing 65 is not executed but the flow proceeds to the processing 66, where parallelization means selection processing 5 in FIG. 1 is called. The outline of this processing is shown in a PAD diagram in FIG. 9. In the case of the DO 10I loop, the speed of serial execution is higher than that of any other systems, the processing 92 selects it and fills the fields 33 and 34. Therefore, the fields become such as 23'-34' shown in FIG. 11. The processing 69 shows this time the table 38 of the DO 10J loop through the judgement of the processing 67 in FIG. 6 and again executes the processing shown in FIG. 6.

Figure 10:
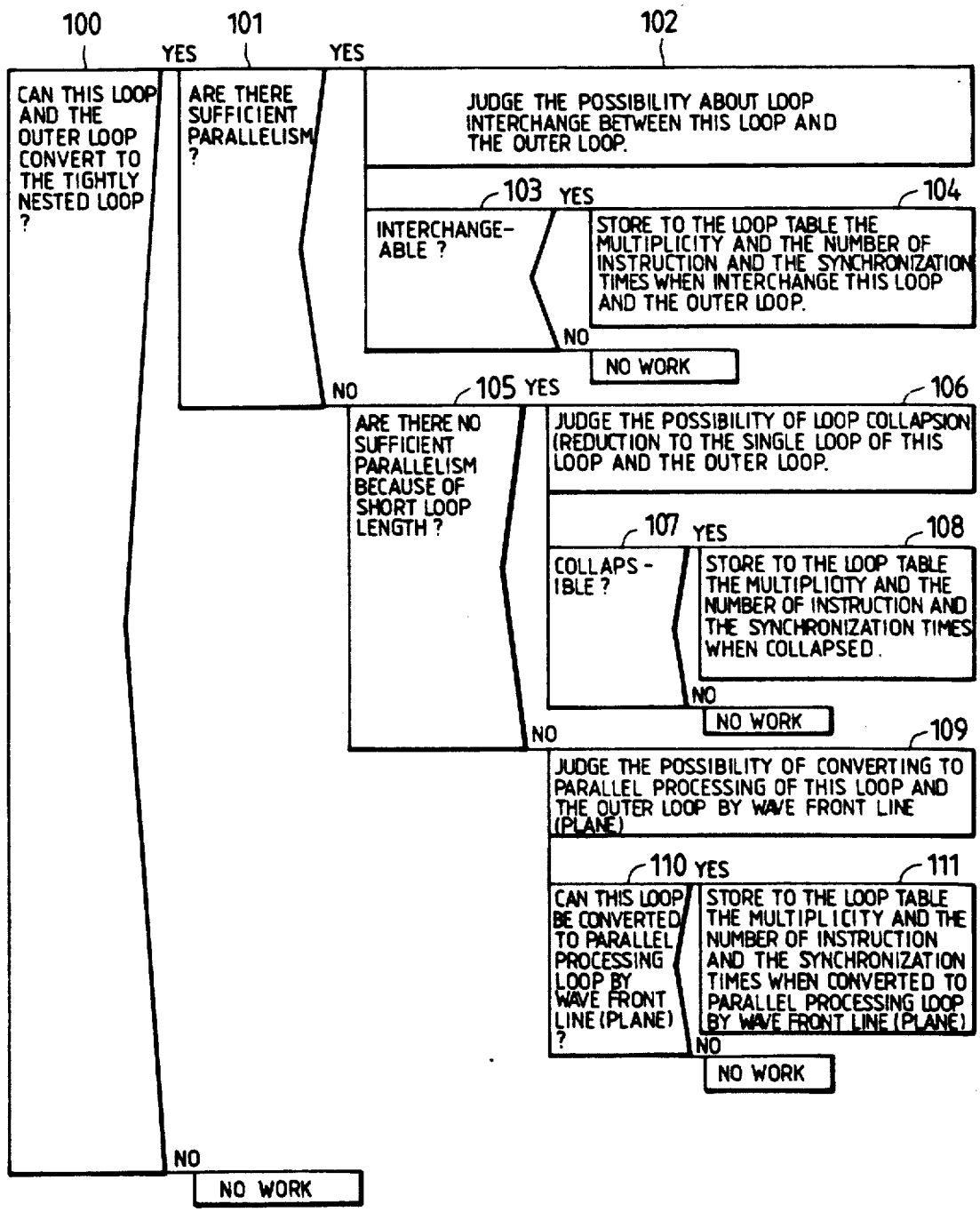
FIG. 10 shows the outline of a loop structure conversion feasibility judgement processing.

Since no carried dependence relating to the loop exists for the DO 10J loop from the statement 18 to the statement 21 in FIG. 4, the processing 71 in FIG. 7 stores the loop length 100 in the field 40 in FIG. 5. Furthermore, the processing 73 and 74 store the number of instructions 2 per loop in the fields 41, 42 and the product 2000 obtained by multiplying the loop length 100 of the inner loop and the loop length 10 of the outer loop is stored in the field 39. Since synchronization control is necessary for each outer loop due to the dependence on the outer loop, the information that the number of synchronization controls is 1 per 200 instructions is stored in the field 43. The processing 62 shown in FIG. 6 judges that there is already sufficient parallelism due to parallelization of the number of times of iterations. Therefore, the processing 63 is not executed but the processing 65 calls the loop structure convertibility judgement processing 4 in FIG. 1 through the processing 64. The outline of this processing is shown in FIG. 10.

Since tightly nested multiplication is possible with this outer loop in the DO 10J loop of the statements 18 to 21 in FIG. 4, the flow proceeds from the processing 100 to the processing 101. Here, it is known that sufficient parallelism can be obtained by parallel execution for each iteration of the loop, the processing 102 examines the possibility of loop interchange in order to improve granularity. If the result proves YES, the processing 104 prepares the tables 120 to 127 of FIG. 11 so as to represent the multiplicity, the number of instructions and synchronization control when the loop interchange is made, and the estimated values described above are stored. The multiplicity does not change and the loop length is 100 (in field 123 of FIG. 11). However, the instruction granularity changes to 20 due to the loop interchange (fields 124, 125) and the synchronization control becomes unnecessary during the operation. Accordingly, the synchronization of once per 2000 instructions is stored in the field 126 in the sense that it is made once after all the instructions are complete If there is the loop carry dependence, the processings 109 and 111 examine the possibility of converting the loop by wave front line (plane) and calculate the multiplicity, the instruction granularity and synchronization control at that time and store them in the tables. If the loop length is short and the multiplicity and the instruction granularity are small even when the data dependence relation is independent, the processings 106 and 108 examine the possibility of loop collapsion (reduction to the single loop), calculate the multiplicity and synchronization control at that time and stores them in the tables. Therefore the flow proceeds to the processing 66 in FIG. 6, which calls the parallelization means selection processing 5 of FIG. 1 and the judgement is made as shown in FIG. 6. In the processing 92, the instruction that each iteration is executed in parallel is stored in the field 49' in FIG. 11 and the processings 94 and 95 make the loop interchange from the results of the tables designated by the field 48' and select means for executing the iteration times of the DO 10J loop. The processing 97 stores the pointer of the tables of the fields 120 to 127 in the field 49' in FIG. 11 and the processing 59 sets the number of processors to NPE and stores the estimated elapsed time 20×100/NPE in the field 50' because no synchronization control exists.

Figure 11:
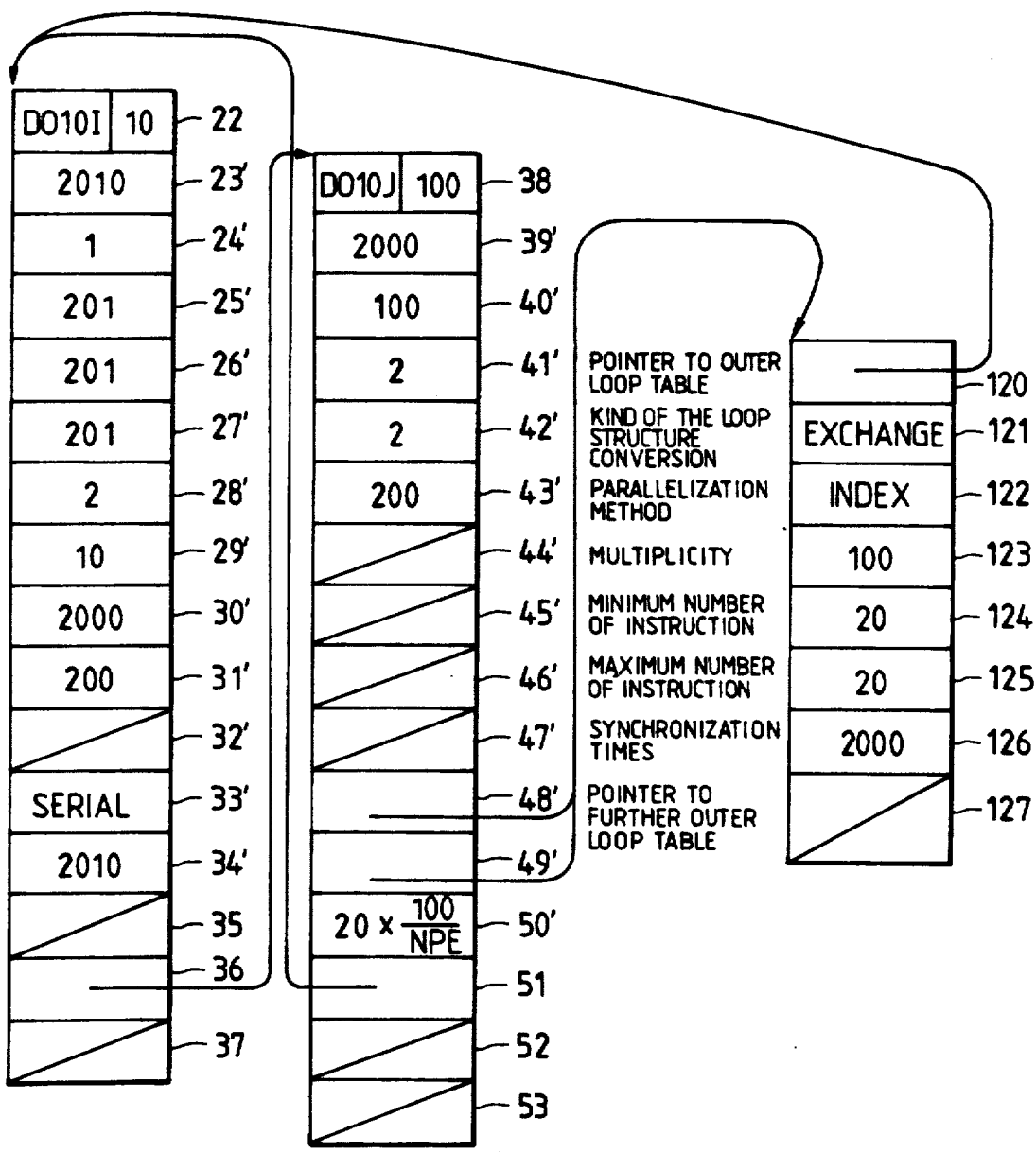
FIG. 11 shows a loop table.
Figures 12, 13:
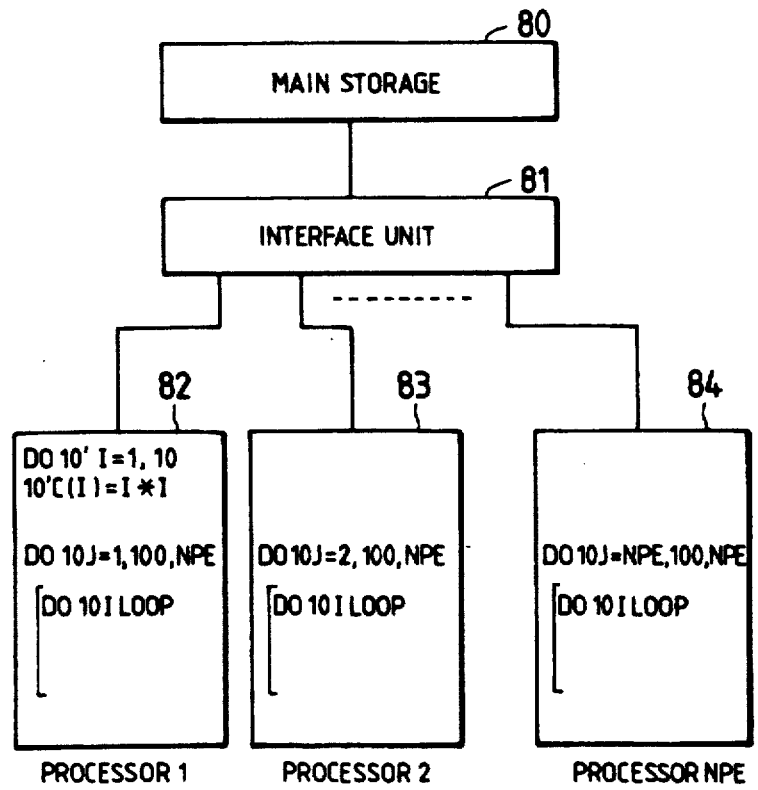
FIG. 12 shows a program after parallelization conversion.
FIG. 13 shows the outline at the time of execution.

When the detection, evaluation and selection of parallelism for the FORTRAN program shown in FIG. 4 are completed in this manner, the loop table 7 shown in FIG. 1 changes to the table shown in FIG. 11. From this table the processings subsequent to the middle process 14 in FIG. 3 convert the program shown in FIG. 4 to the intermediate language 6 as shown in FIG. 12. Each iteration is executed in parallel for the loop 131. Thus the code generation processing 15 in FIG. 3 generates the object code 12, and the mode during the execution of this object code is shown in FIG. 13. Each iteration of the loop 131 in FIG. 12 is allotted to the NPE sets of processors and executed in parallel.

Thus the present invention has been described in detail with reference to one embodiment thereof.

Broadly speaking, the embodiment described above can be accomplished by software as a system by a large-scale computer or the like but can be accomplished hardware-wise by using micro-processors or mini-computers and necessary storage devices for each parallelism detection function 2, 3, loop structure convertibility judgement 4, parallelization means section 5, etc., shown in FIG. 1.

In accordance with the present invention described above, conventional serial execution type user programs can be executed automatically and at a high speed by a parallel processing system without the need of re-coding them. At this time a high object code having high execution efficiency and a short elapsed time can be generated by using effectively the hardware resources.

What is claimed is:

1. A parallelization method for compiling at least a part of a source program into object code representing processes executable in parallel, comprising steps executed by a data processor apparatus, the method comprising:

before converting the part of the source program into object code, estimating execution time each required for execution of one group of parallel processes within groups of parallel processes which groups will be respectively obtained by application of a plurality of predetermined parallelization conversions to the part of the source program;

selecting one of the predetermined plurality of parallelization conversions which produces one group of parallel processes having the shortest execution time among the estimate execution times;

applying the selected one parallelization conversion to the part of the source program; and, converting a source program obtained by said applying step, into an object code representing the one group of parallel processes.

2. The method of claim 1, wherein the part of the source program comprises a loop portion included in the source program and the step of estimating includes the step of estimating the execution times each required for execution of one group of parallel processes within a plurality of groups of parallel processes which groups will be respectively obtained by application of the plurality of predetermined parallelization conversions to the loop portion.

3. The method of claim 2, wherein the loop portion comprises a multiple loop portion and the step of estimating includes the step of estimating the execution times each required for execution of one group of parallel processes within a plurality of groups of parallel processes which groups will be respectively obtained by application of the plurality of combinations to the multiple loop portion.

4. The method of claim 2, wherein the plurality of parallelization conversion include a first and second parallelization conversion, and wherein:

the first parallelization conversion comprises converting the loop portion into parallel processes generated having a one-to-one correspondence for different values of an iteration variable of the loop portion, each of the generated parallel processes executing processing required by a sequence of statements included in the loop portion when that sequence of statements are executions for a corresponding value of the iteration variable; and, the second parallelization conversion comprises converting the loop portion into parallel processes generated having one-to-one correspondence for different statements within the loop portion, each of the generated processes executing processing required by a corresponding statement within the loop portion when that corresponding statement is executed for different values of the iteration variable.

5. The method of claim 4, wherein the loop portion comprises multiple loops;

wherein the first parallelization conversion comprises converting the multiple loops into parallel processes generated having a one-to-one correspondence for different values of an iteration variable of an outermost loop of the multiple loops, each of the generated processes executing processing required by a sequence of statements included inside the outermost loop when that sequence of statements are executed for a corresponding value of the iteration variable of the outermost loop and for different values of an iteration variable of an inner loop; and, the second parallelization conversion converts the multiple loops into parallel processes generated having a one-to-one correspondence for different statements within the outermost loop, each of the generated processes executing processing required by a corresponding statement within the outermost loop when that corresponding statement is executed for one of the different values of iteration variables of the multiple loops.

6. The method of claim 4, wherein the step of estimating the execution times further comprises:

detecting, for each group of parallel processes, multiplicity of the parallel processes of the group, granularities of the processes of the group and total time periods required for synchronization of execution of the parallel processes of the group; and estimating, for each group of parallel processes, an execution time of the group of parallel processes, based upon the multiplicity, said granularities and the total time periods detected for the group.

7. A parallelization method for compiling at least a part of a source program into an object program representing parallelly executable processes, comprising steps executed by a data processing apparatus, the method comprising the steps of:

before converting the part of the source program into object code, estimating execution times, each being a time required for execution of a group of parallel processes which groups will be respectively within groups of parallel processes obtained by a plurality of combinations, each combination being a combination of at least one predetermined structure conversion and at least one predetermined parallelization conversion, each structure conversion converting said part of the source program into an equivalent program portion of a different structure, and each parallelization conversion converting the program portion obtained by at least one structure conversion into parallelly executable processes which execute in combination processing required by the obtained program portion;

selecting one of the plurality of combinations which produces one group of parallel processes the execution time estimated for which is shortest among the estimated execution times;

applying the at least one structure conversion associated with the selected one combination to the part of the source program to obtain a new program portion and then applying the at least one parallelization conversion to the new program portion; and, converting a source program obtained as a result of the applying of said one parallelization conversion into an object code representing the one group of parallel processes.

8. The method of claim 7, wherein the part of the source program comprises a loop portion within said part of the source program and the step of estimating includes the step of estimating the execution times each required for execution of one group of parallel processes within a plurality of groups of parallel processes which groups will be respectively obtained by application of the plurality of combinations to the loop portion.

9. The method of claim 8, wherein said loop portion comprises multiple loop portion within said part of the source program and the step of estimating includes the step of estimating the execution times each required for execution of one group of parallel processes within a plurality of groups of parallel processes which groups will be respectively obtained by application of the plurality of combinations to the multiple loop portion.

10. The method of claim 9, wherein the at least one structure conversion includes at least one of first to third structure conversions, wherein:
the first structure conversion comprises interchanging an outer one of the multiple loops by an inner one thereof;
the second structure conversion comprises collapsing the multiple loops into a single loop; and
the third structure conversion comprises converting the multiple loops into loop iteration variables which change according to a wave front line and a wave front plate.

11. The method of claim 10, wherein the at least one parallelization conversion includes at least one of first to fourth parallelization conversions, wherein:
the first parallelization conversion comprises converting multiple loops obtained by a one of the first to the third structure conversions into parallel processes generated having a one-to-one correspondence for different values of an iteration variable of an outermost loop of the obtained multiple loops, each of the generated processes executing processing required by a sequence of statements included inside the outermost loop of the obtained multiple loops when that sequence of statements are executed for a corresponding value of the iteration variable of the outermost loop of the obtained multiple loops for different values of an iteration variable of an inner loop of the obtained multiple loops;
the second parallelization conversion comprises converting the obtained multiple loops into parallel processes generated having a one-to-one correspondence for different statements within the outermost loop of the obtained multiple loops, each of the generated processes executing processing required by a corresponding statement within the outermost loop of the obtained multiple loops when that corresponding statement is executed for different values of iteration variables of different one of the obtained multiple loops;
the third parallelization conversion comprises converting the single loop obtained by the second structure conversion into parallel processes generated having a one-to-one correspondence for different values of an iteration variable of the obtained single loop, each of the generated processes executing processing required by a sequence of statements included in the obtained single loop when that sequence of statements are executed for a corresponding value of the iteration variable of the obtained single loop; and,
the fourth parallelization conversion comprises converting the obtained single loop into parallel process generated having a one-to-one correspondence for different statements within the obtained single loop, each of the generated processes executing processing required by a corresponding statement within the obtained single loop when that corresponding statement is executed for a different value of the iteration variable of the obtained single loop.

12. The method of claim 11, wherein said step of estimating execution times includes the steps of:

detecting, for each group of parallel processes, multiplicity of the parallel processes of the group, granularities of each of the parallel processes within the group, and total time periods required for synchronization of execution of the parallel processes of the group; and,
estimating, for each group of parallel processes, an execution time of the group of parallel processes, based upon the multiplicity, the granularities, and the total time periods detected for the group.

13. A parallelization method for compiling a multiple loop portion within a source program into an object program representing parallelly executable processes which execute in combination processing required by the original multiple loop portion of the source program, the method comprising steps executed by a data processing apparatus, the steps including:
converting the source program into intermediate language;
before converting the intermediate language into object code, estimating, from the intermediate language, first execution time required for execution of processing to be exectuted for one iteration of the outermost loop of the multiple loop portion;
estimating, from the intermediate language, at least one second execution time required for execution of processing to be executed for one iteration of a new outermost loop of a new loop portion which will be obtained by application of at least one loop structure conversion to the original multiple loop portion;
detecting which one of the estimated first and second execution time is smaller;
converting the intermediate language into an object program representing processing to be executed for each iteration of the outermost loop either of the multiple loop or of the new loop, depending upon whether the estimated first execution time or the second execution time is detected to be smaller.

14. A method of claim 13, wherein the loop structure conversion includes replacement of the outermost loop of the multiple loop portion by an inner loop thereof.

15. A method of claim 14, wherein the loop structure conversion includes conversion of the multiple loop portion into a single loop portion.

16. A method of lucia 14,
wherein the estimating step of the first execution time includes the step of estimating a maximum one among execution times respectively required for processings to be executed respectively for different iterations of the outermost loop of the multiple loop portion; and
wherein the estimating step of the second execution time includes the step of estimating a maximum one among execution times respectively required for processings to be executed respectively for different interactions of the outermost loop of the new loop portion.

17. A method of claim 13, wherein the estimating step of the second execution time includes the step of:
judging processings to be executed for each iteration of the new loop portion, based upon the intermediate language.

* * * * *